United States Patent
Alidina et al.

(10) Patent No.: US 6,446,193 B1
(45) Date of Patent: Sep. 3, 2002

(54) METHOD AND APPARATUS FOR SINGLE CYCLE PROCESSING OF DATA ASSOCIATED WITH SEPARATE ACCUMULATORS IN A DUAL MULTIPLY-ACCUMULATE ARCHITECTURE

(75) Inventors: Mazhar M. Alidina; Sivanand Simanapalli, both of Allentown, PA (US); Larry R. Tate, South Barrington, IL (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 08/925,302

(22) Filed: Sep. 8, 1997

(51) Int. Cl.[7] .................. G06F 9/302; G06F 13/40; G06F 13/20; G06F 13/42
(52) U.S. Cl. ................. 712/35; 712/4; 712/8; 712/9; 712/7; 712/16; 712/220; 712/221; 712/222; 710/129; 710/128; 710/130
(58) Field of Search .............. 712/1, 2, 7, 8, 712/16, 32, 35, 4, 9, 220, 222, 221; 708/316, 420, 523, 232, 625, 501; 710/129, 128, 130

(56) References Cited

U.S. PATENT DOCUMENTS

| | | | | |
|---|---|---|---|---|
| 4,811,263 A | | 3/1989 | Hedley et al. .............. 708/316 |
| 5,053,986 A | * | 10/1991 | Ahsan et al. ................ 364/736 |
| 5,119,324 A | * | 6/1992 | Ahsan ........................ 364/736 |
| 5,278,781 A | * | 1/1994 | Aono et al. ................. 364/736 |
| 5,307,300 A | * | 4/1994 | Komoto et al. ............. 364/736 |
| 5,329,283 A | * | 7/1994 | Smith et al. .................. 342/25 |
| 5,511,015 A | | 4/1996 | Flockencier ................ 708/420 |
| 5,522,085 A | * | 5/1996 | Harrison et al. ............ 395/800 |
| 5,583,804 A | | 12/1996 | Seal et al. ................... 708/523 |
| 5,692,168 A | * | 11/1997 | McMahan .................... 395/584 |
| 5,793,661 A | * | 8/1998 | Dulong et al. ......... 364/736.01 |
| 5,801,975 A | * | 9/1998 | Thayer et al. ......... 364/725.03 |
| 5,805,477 A | * | 9/1998 | Perner et al. .......... 364/716.03 |

OTHER PUBLICATIONS

Turley, Jim, "Atmel AVR Brings RISC to 8–Bit World," *Microprocessor Report,* Microdesign Resources, Jul. 14, 1997, pp 10–12.

* cited by examiner

Primary Examiner—Daniel H. Pan

(57) ABSTRACT

A method and apparatus for reducing instruction cycles in a digital signal processor wherein the processor includes a multiplier unit, an adder, a memory, and at least one pair of first and second accumulators. The accumulators include respective guard, high and low parts. The method and apparatus enable vectoring the respective first and second high parts from the accumulators to define a single vectored register responsive to a single instruction cycle and processing the data in the vectored register.

24 Claims, 4 Drawing Sheets

METHOD AND APPARATUS FOR SINGLE CYCLE PROCESSING OF DATA ASSOCIATED WITH SEPARATE ACCUMULATORS IN A DUAL MULTIPLY-ACCUMULATE ARCHITECTURE

FIELD OF THE INVENTION

The invention relates to digital signal processor architectures and processing methods, and more particularly concerns a method for reducing the number of processor cycles required to perform certain operations in a digital signal processor of the type which can perform concurrent, plural operations.

BACKGROUND OF THE INVENTION

A digital signal processor (DSP) is a special-purpose CPU utilized for digital processing and analysis of signals from analogue sources, such as sound. The analog signals are converted into digital data and analyzed using various algorithms, such as Fast Fourier Transforms. DSPs are designed for particularly fast performance of certain operations, such as multiplication, multiplying the accumulating, and shifting and accumulating, because the math-intensive processing applications for DSPs rely heavily on such operations. For this reason, a DSP will typically include special hardware circuits to perform multiplication, accumulation and shifting operations.

DSP designers strive to implement architectures capable of processing software instructions at ever increasing rates. In as much as performing an instruction takes a certain number of clock cycles, eliminating unnecessary instructions substantially increases a DSPs' performance. One common performance or efficiency benchmark utilized in the industry takes into account the number of MIPs, or millions of instructions per second, that the DSP is capable of carrying out. The greater the number, the more efficient the architecture is considered.

Designers are therefore constantly striving to increase the number of MIPs provided by their processors. The most common way of achieving this is to increase the speed of the processor. Any operation performed by the processor will require a given number of operating cycles of the processor, typically one or two. When the speed of the processor is increased, the duration of a cycle is reduced, and a corresponding increase in the number of MIPs can be expected.

One form of DSP architecture that exhibits significantly large MIPs is known as a Multiply-Accumulate or MAC processor. The MAC processor implements an architecture that takes advantage of the fact that the most common data processing operations involve multiplying two values, then adding the resulting value to another and accumulating the result. These basic operations are efficiently carried out utilizing specially configured, high-speed multipliers and accumulators, hence the "Multiply-Accumulate" nomenclature.

A second method for increasing the number of MIPs is to perform different processes concurrently. Towards this end, DSP architectures with plural MAC structures have been developed. For example, a dual MAC processor is capable of performing two independent MAC operations concurrently.

As one of the primary building blocks of the MAC architecture, accumulators comprise registers that act as sources or destinations of information for arithmetic units. Typically, in a MAC architecture, accumulators either receive data the arithmetic unit loaded from memory or transmit data from the arithmetic unit for storage to a memory. In other words, the accumulators hold input data as well as the output results of mathematical computations such as accumulations and shifts.

An accumulator is typically designed to include separately addressable high and low parts and often a number of guard bits (for overflow, etc.). Loading of bits into the accumulator from a memory normally occurs in the high part of the accumulator. A typical accumulator might be 40 bits in length and include 16 bits for the high and low parts, and an 8 bit section for the guard. Thus, in a conventional DSP having several accumulators to load and/or store results, a separate instruction would be required to load or store each accumulation or part. Since data transfers to or from accumulations are an extremely frequent occurrence, any acceleration of such transfers or reduction in their frequency of occurrence would provide more efficient processing, and substantially improve the number of MIPs. Where the number of accumulators becomes quite large, the instruction requirement becomes problematic when designing for efficient processing or maximizing MIPs.

One example of the problem of instruction heavy accumulator processing relates to infinite-impulse response filters. These filters generally require a substantial number of multiplication and accumulation operations to iteratively filter out unnecessary data. Consequently, because of the relatively large number of accumulators accesses required to effect filtering in a conventional processor, the number of corresponding instructions is relatively large.

Therefore, the need exists for a DSP method and architecture having the capability of loading and storing data to and from accumulators with fewer accesses. The method and architecture of the present invention satisfy this need.

SUMMARY OF THE INVENTION

The method and architecture of the present invention provide the advantages of to high speed and efficient DSP performance while substantially reducing the number of instructions necessary to effect accumulator processing in a dual MAC processor.

To realize the advantages above, the present invention, in one aspect, comprises a method for substantially reducing the number of instruction cycles in a digital signal processor which are dedicated to accumulator data transfers. The processor includes a multiplier unit, an adder, memory, and a plurality of accumulators. The accumulators include respective high and low parts, each of which contains a sufficient number of bits to be of or input value to the multiplex. The method includes the steps of concatenating or "vectoring" the parts from accumulators to define a single vectored register responsive to a single instruction cycle and then processing the data in the vector register. Thus, the two different register parts are processed in a single processor cycle, instead of two.

In another aspect, the invention comprises a vectored register for use in a digital signal processor of the type including a plurality of accumulators, a multiplier unit, an adder, and memory. The accumulators include respective high and low parts with the vectored register comprising a first part from a first of the accumulators and a second part from a second of the accumulators. The first and second parts cooperate to define a vector subjected to processing as if it were a single register.

In yet another aspect, the invention comprises a register array for use in a digital signal processor employing a dual Multiply-Accumulate architecture. The register array includes a plurality of accumulators including respective high and low parts. The parts of different accumulators are combined to define a vectored data structure. A multiplier unit is operatively in data communication with the plurality of accumulators and data is selectively transferred between the accumulators and the vectored data structure. A memory is connected to the plurality of accumulators to alternatively store data loaded from or load data to the vector. The vectored data structure effects the loading or storing operations during a single instruction cycle.

In a further aspect, the invention comprises a data arithmetic unit for use in a digital signal processor. The unit includes a data computation module for calculating values from respective sets of data and a data transfer path for directing the input and output of the calculated values. The data computation module comprises a multiplier, respective output product registers, and a plurality of accumulators including respective high and low parts. Parts of accumulators are concatenated to define a vector. The multiplier is coupled to receive data loaded from the vector, while memory is connected to the plurality of accumulators to store data from and load data to the vector. During operation, the vector is processed in the manner of a register, so that the two parts comprising the vector may be processed in a single instruction cycle to effect efficient loading or storing operations.

BRIEF DESCRIPTION OF THE DRAWINGS

Other features and advantages of the present invention win be apparent from the following detailed description when read in conjunction with the accompanying drawings, wherein.

DETAILED DESCRIPTION OF THE INVENTION

The number of MIPs, or millions of instructions per second, that a processor can handle often serves as the supreme benchmark for the processors' overall performance. As a corollary to this performance indicator, repetitive operations that can be carried out in parallel, so as to reduce the number of instructions, typically enhance the MIPs number by freeing up valuable instruction time for other operations.

Figure 1:
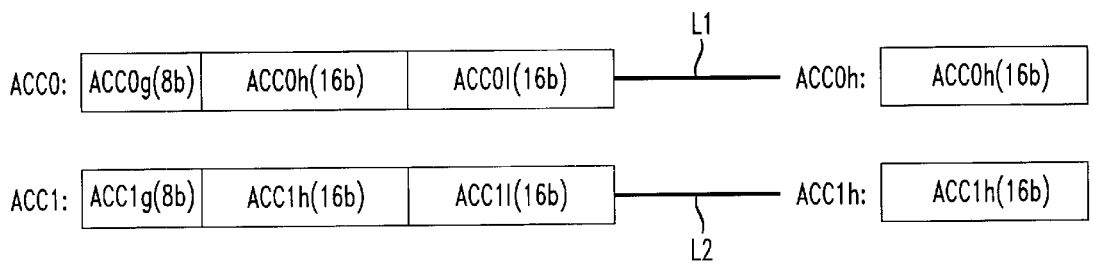
FIG. 1 is a block diagram of a conventional accumulator pair.

Referring now to FIG. 1a, conventional processor architectures could typically include one or more 40-bit accumulators ACC0 and ACC1 that are respectively partitioned into respective 8-bit guard ACC0g, 16-bit high ACC0h, and 16-bit low parts ACC0l. Sizes for the respective parts tend to vary from processor to processor. Data bits might, for example, be loaded into and stored from the respective high halves in response to separate instructions, represented by L1 and L2. In conventional architectures, the number of instructions required to accomplish accumulator data transfers often approaches prohibitive levels when endeavoring to maintain acceptable processing efficiency.

Figure 2:
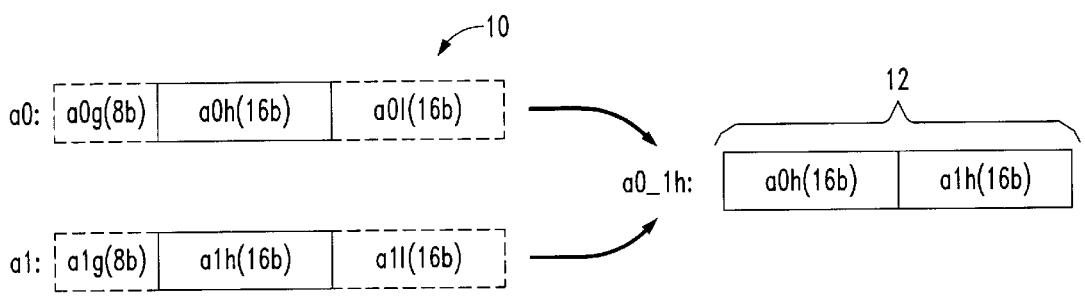
FIG. 2 is a block diagram of an accumulator pair defining a vector register according to the present invention.

As illustrated in FIG. 2, the present invention concatenates the parts of two different accumulators a0, a1 to define a corresponding vector register 12, which is responsive to a single instruction. As a result, the number of instructions required to effect loading and storing of data to and from a pair of accumulators is essentially halved.

Further referring to FIG. 2, the accumulator pair 10 comprises respective first and second accumulators a0 and a1 for receiving data loaded from a memory (not shown) or other register unit, or storing data to the memory or other register unit. The accumulators a0 and a1 include respective parts a0$h$ and a1$h$ that are concatenated to define the vector a0_1$h$, which may be treated like a register. The defined vector register enables the two high parts to be processed concurrently. This architecture effectively reduces in half the number of instruction cycles otherwise required to process the parts.

Figure 3:
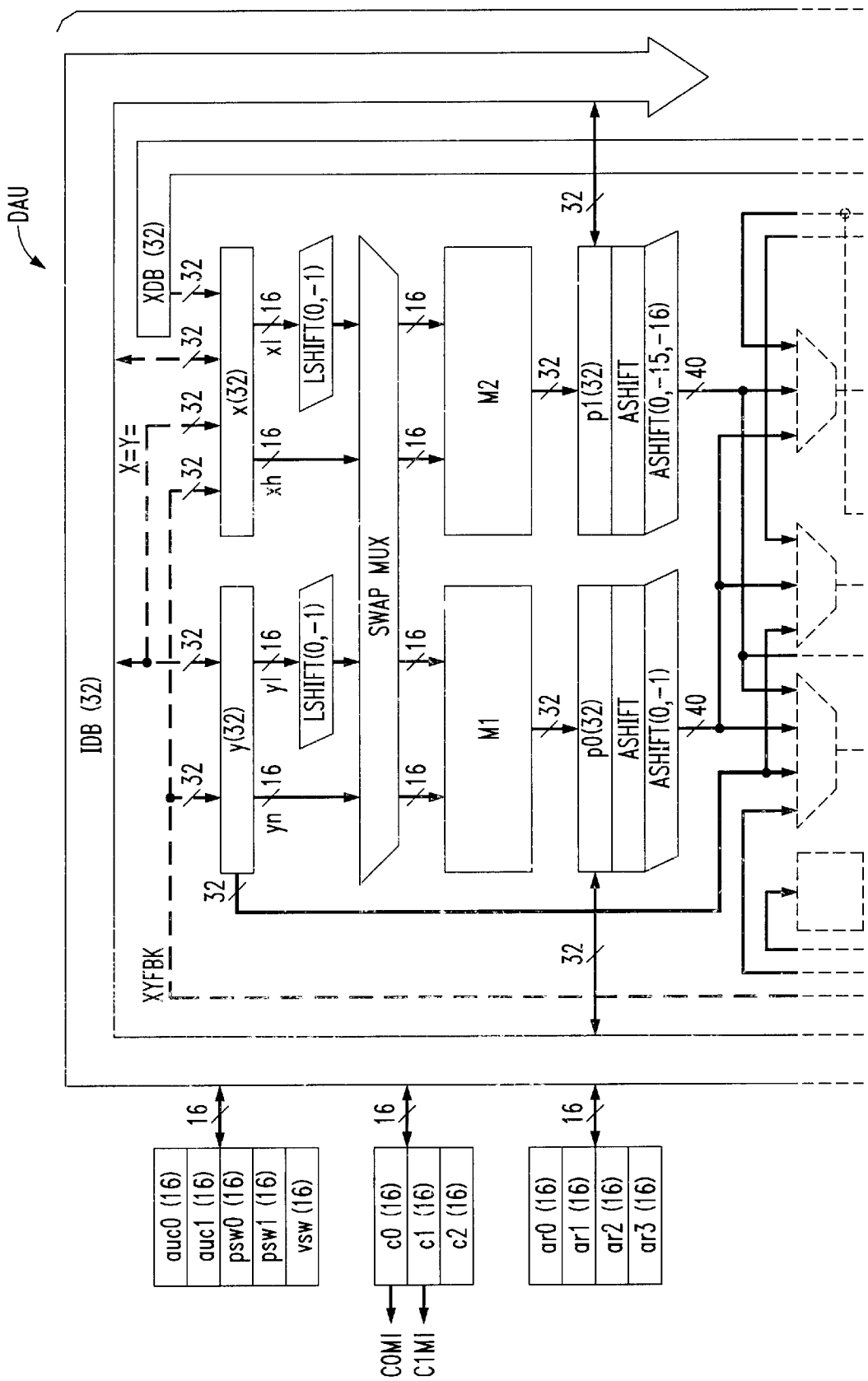
FIG. 3 is a schematic diagram of a data path for a data arithmetic unit according to the present invention.
Figure 3:
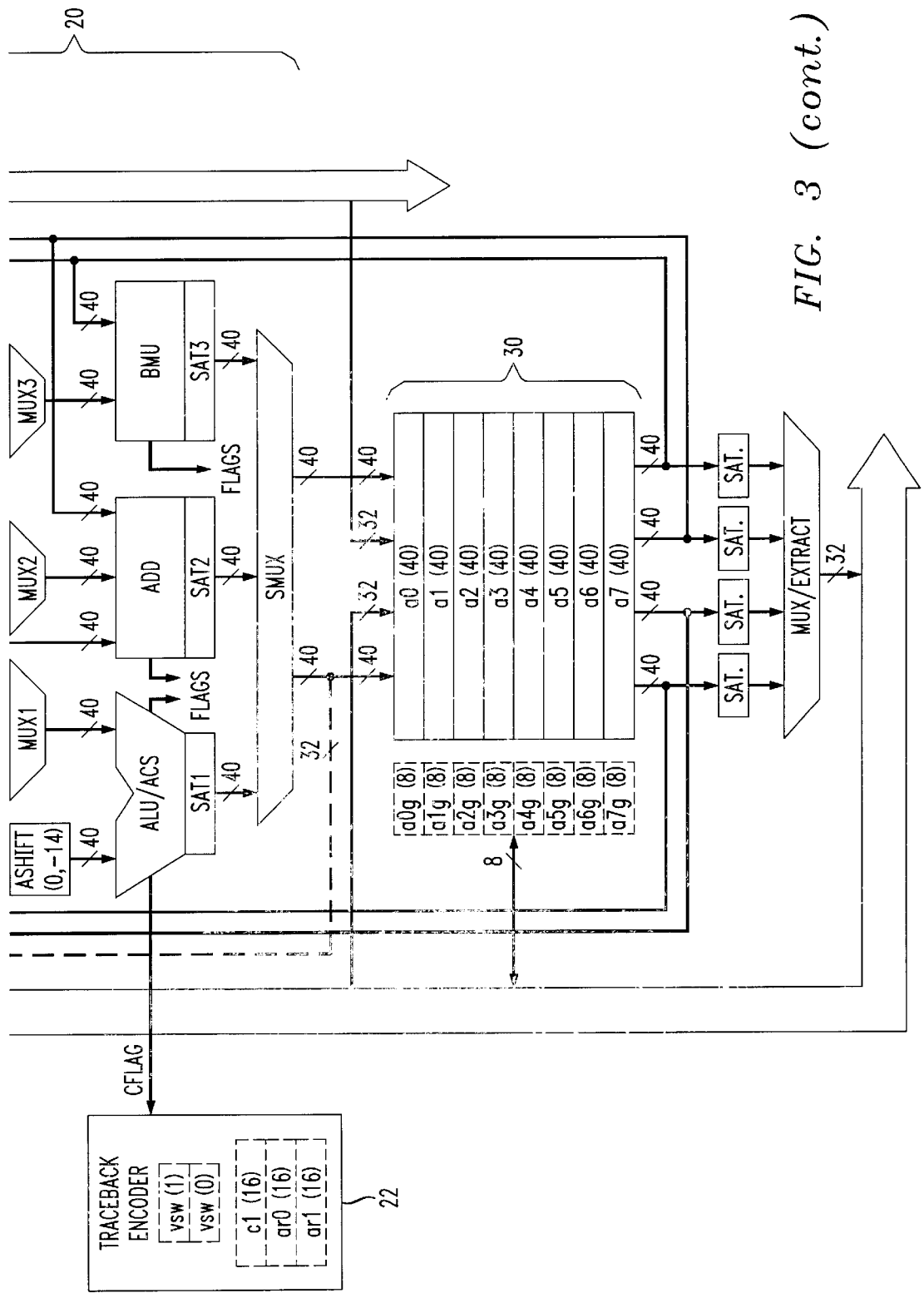

Referring now to FIG. 3, the present invention may be implemented in a wide range of digital signal processing applications. In particular, we have found that incorporating the invention in a data arithmetic unit DAU for use in a dual-MAC processor affords substantial benefits in computing efficiency. In such an example, the data arithmetic unit comprises a power-efficient dual-MAC parallel-pipelined structure particularly optimized for wireless and speech synthesis applications.

The front end of the data arithmetic unit DAU comprises, generally, (see FIG. 3), a data computation module 20 for performing the initial stages of any arithmetic calculations. The data computation means includes dual 32-bit registers x(32) and y(32) that are operated as four 16-bit registers yh, yl, xh and xl when used to provide the inputs to two signed 16-bit×16-bit multipliers M1 and M2. The respective multipliers produce respective 32-bit results stored into respective product registers p0(32) and p1(32). The product registers communicate with a 32-bit data bus IDB(32) that serves as the primary data path for the data arithmetic unit.

The data stored in the respective product registers p0(32) and p1(32) may undergo arithmetic register shifts and are fed through one or more multiplexers MUX1, MUX2, or MUX3 to either a 40-bit arithmetic-logic-unit ALU with an add/compare/select feature ACS, a 40-bit manipulation unit BMU, or a 40-bit 3-input adder/subtractor ADD. The arithmetic unit implements addition, subtraction, and various logical operations. The bit manipulation unit implements barrel-shifts, bit insertion and extraction, and normalization. As a complement to the arithmetic and bit manipulation units, the adder performs general addition and subtraction operations. Concurrent multiply and accumulation operations may be achieved by using the two multipliers, the ALU and the ADD.

Respective saturator units SAT1, SAT2, and SAT3 disposed at the outputs of the respective arithmetic, bit manipulation and adder units ALU, BMU and ADD enable overflow saturation to modify the respective results. The overflow saturation feature also optionally affects accumulator values as the data is transferred to memory or to one or more registers. This feature accommodates various speech coding standards such as Global System Modulation, or GSM, vocoders at full, half and enhanced full rates. Moreover, shifting in the arithmetic pipeline occurs at several stages to accommodate various standards for extended-precision multiplications.

Figure 4:
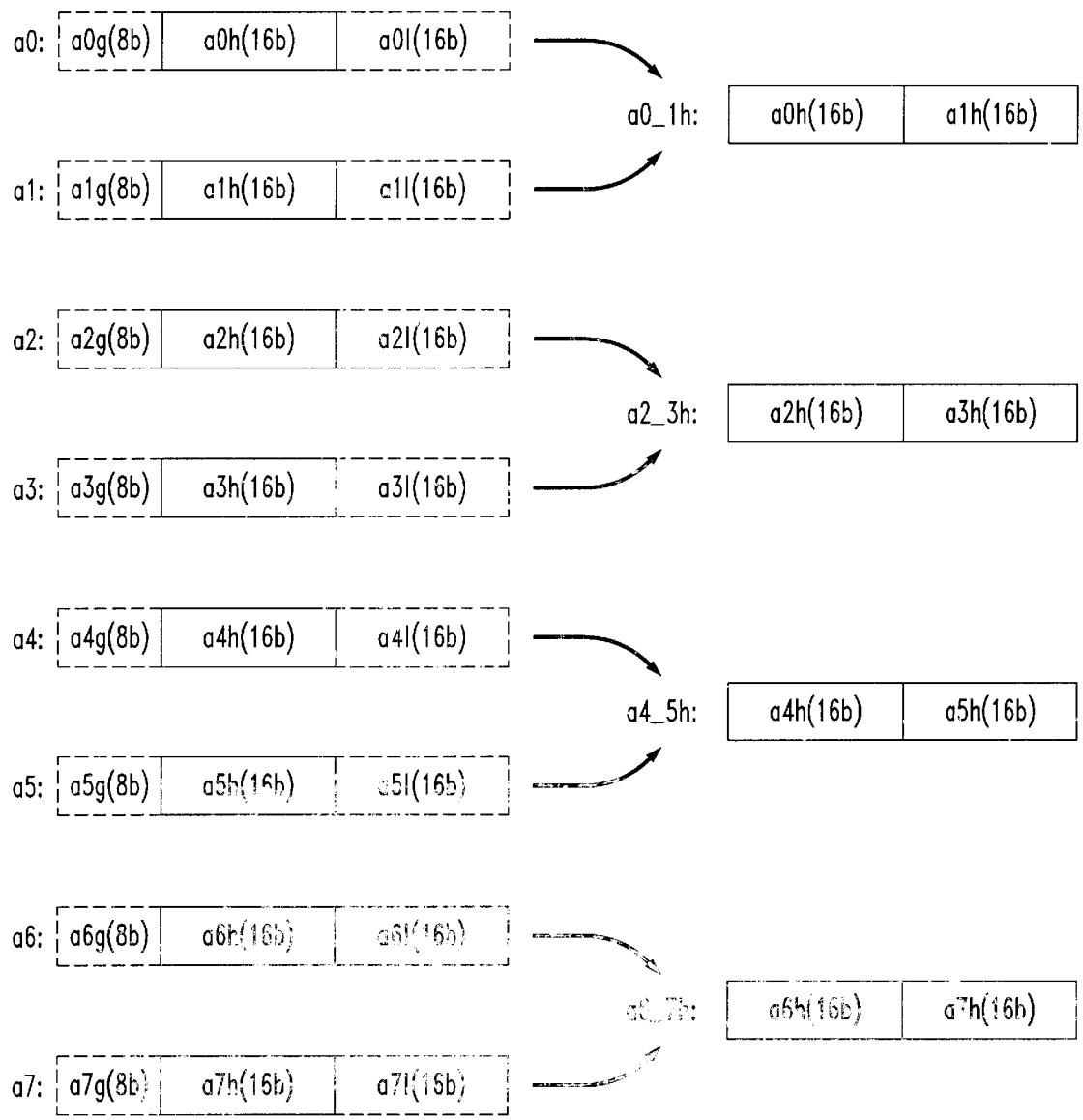
FIG. 4 is a block diagram of the register file of FIG. 3.

The modified results from the respective saturators SAT1, SAT2 and SAT3 are then fed through a split multiplexer SMUX to a register array 50 comprising eight 40-bit accumulators a0 through a7. As shown more clearly in FIG. 4, sequentially disposed accumulators are grouped into four accumulator pairs 52, 54, 56 and 58. Each of the respective accumulator pairs includes respective high parts a0*h* through a7*h*. The respective 16-bit high halves or parts of the respective accumulator pairs are concatenated into 32 bit registers or vectors which, for accumulator instruction purposes, are identified as a0_*h*, a2_3*h*, a4_5*h*, and a6_7*h*.

The data arithmetic unit DAU also conveniently includes a plurality of 16-bit, bus-accessible control registers including counters c0–c2, arithmetic unit control registers auc0 and auc1, processor status words psw0 and psw1, auxiliary registers ar0–ar3, and a Viterbi support word vsw.

As an added feature, the eight accumulators are controlled according to modes defined by preselected mode bits provided by control registers auc0 and auc1 to selectively provide feedback along a feedback path XYFBK to the x–y multiplier registers x(32) and y(32). This unique feature is more fully described in the copending U.S. Patent Application owned by the assignee of the present application, hereby expressly incorporated by reference in its entirety.

Operation of the data arithmetic unit DAU according to the present invention takes advantage of the unique dual-MAC architecture employed to minimize the number of instructions required to effect accumulator processing. Accordingly, the inclusion of accumulator pairs 52, 54, 56 and 58 into the register array 50 affords the opportunity to dramatically reduce the number of instructions by vectoring the respective high parts a0*h* through a 7*h* from the sequentially disposed accumulators a0 through a7 to define the respective vector registers a0_1*h*, a2_3*h*, a4_5*h*, and a6_7*h*.

During operation, calculated values are loaded into the respective vector registers a0_1*h*, a2_3*h*, a4_5*h*, and a6_7*h* through a set of vector instructions rather than accumulator specific instructions. The set of vector instructions generally comprise command strings that identify the respective accumulator pair high parts as the respective vector registers. As a result, pairs of high halves, rather than single high parts, respond to a single instruction.

For example, when scaling a block of N 16-bit data by a constant, representative instructions may be given by:

```
r0 = MEM_LOC
r1 = r0
ar0 = CONSTANT
a0_1h = *r0++
a2 = a0 >> ar0
do N/2 {
    a3 = a1 >> ar0   a0_1h = *r0++
    a2 = a0 >> ar0   *r1++ = a2_3h
}
```

In the example above, ar0 represents a 16-bit register that holds the scaling constant, and *r0++ and *r1++ indicate a load or store to memory with indirect addressing and a post-increment of the pointer. More specifically indirect addressing involves using the contents of the indicated register as a pointer to a memory location containing information to be processed or to receive information, so the fourth line of code involves reading from the address which is stored in r0 (i.e. MEM_LOC). The double plus sign at the end of the line indicates that the content of r0 is incremented after the transfer (i.e. to MEM.LOC+1). The fifth line of code shifts the content of a0 right by the number of positions equal to the content of ar0 (i.e. CONSTANT) and stores the result in a2. The sixth line of code is the start of a repetitive loop. In the first instruction of the loop, the current data in accumulator a1 is shifted right (scaled) and loaded into a3. At the same time, new data is loaded into respective high parts a0*h* and a1*h*. In the next instruction, the new data in accumulator a0 is shifted right and loaded into a2. Simultaneously, the previous two high portions of accumulators a2 and a3 are stored to the memory location pointed to by r1, and r1 is incremented.

As shown by the previous example, the code is efficient in that two sets of data are loaded, scaled, and stored every two cycles. In effect, the throughput becomes one scale and load/store per cycle. Given one shifter, this is an optimal configuration.

Those skilled in the art will appreciate the many benefits and advantages afforded by the present invention. Of particular significance is the implementation of vector registers operating from accumulator pairs that are responsive to one instruction cycle for each pair. This pair substantially reduces the number of instructions required for processing, which dramatically improves processor performance.

While the invention has been particularly shown and described with reference to the preferred embodiments thereof, it will be understood by those skilled in the art that various changes in form and detail may be made therein without departing from the spirit and scope of the invention.

What is claimed is:

1. A method for reducing cycles utilized in a digital signal processor, said processor including a multiplier unit, an adder, a memory and a plurality of accumulators, each including a high and low part, said method comprising the steps of:

associating data of a first accumulator with data of a second accumulator to define a single vectored data structure; and transferring said vectored data structure between portions of said digital processor that store data in the manner of single register, whereby the first and second accumulator data comprising said vectored data structure are processed concurrently in a single operation.

2. The method according to claim 1 wherein:

said associating step includes combining the respective data of sequentially disposed accumulators.

3. The method according to claim 2 wherein:

said respective parts are the high parts and comprise 16 bit sections, said concatenating step including sequentially combining said respective 16 bit sections to define a vectored 32 bit data structure.

4. The method according to claim 1 wherein:

said transferring step includes the step of storing said vectored data structure in said memory in one instruction cycle.

5. The method according to claim 1 wherein:

said transferring step includes the step of loading data from said memory into said vectored data structure.

6. A vectored register for use in a digital signal processor comprising a plurality of accumulators, a multiplier unit, an adder, and a memory, said accumulators including respective high and low parts, said vectored register comprising:

a first part from a first of said accumulators; and a second part from a second of said accumulators, said first and second parts being associated with each other in order to define a single vectored data structure for transferring between portions of said digital processor that store data in the manner of a single register, thereby effecting more rapid data processing.

7. A vectored register according to claim 6 wherein:

said vector is operative in response to a single instruction to load data from said memory into said vector.

8. A vectored register according to claim 6 wherein:

said vector is operative in response to a single instruction to load data from said vector to said memory.

9. A vectored register according to claim 6 wherein:

said vector is operative in response to a single instruction to load data from said vector to said multiplier unit.

10. A vectored register according to claim 6 wherein:

said first and second high parts are from respective first and second accumulators disposed sequentially in said processor.

11. A vectored register according to claim 6 wherein:

said first high part comprises 16 bits and said second high part comprises 16 bits such that said vector defines 32 bits.

12. In a digital signal processor comprising a plurality of accumulators, a multiplier unit, and a memory, said accumulators including respective high and low parts, a vectored register comprising:

a first part from a first accumulator; and a second part from a second accumulator, said first and second parts defining a vector to effect storing to said memory in a single instruction cycle.

13. A vectored register according to claim 12 wherein:

said first and second high parts are from respective first and second accumulators disposed sequentially in said processor.

14. A vectored register according to claim 12 wherein:

said first high part comprises 16 bits and said second high part comprises 16 bits such that said vector defines 32 bits.

15. A register array for use in a digital signal processor employing a dual Multiply-Accumulate architecture, said register array including:

a plurality of accumulators, said accumulators including respective high and low parts, said a pair of parts from different accumulators together defining a vector;

a multiplier unit disposed in data communication with said plurality of accumulators to selectively receive data loaded from said defined vector; and a memory connected to said plurality of accumulators to alternatively store data loaded from or load data to said defined vector whereby said vector is responsive to a single instruction cycle to effect said loading or storing operations.

16. A register array according to claim 15 wherein:

said plurality of accumulators comprise at least one pair of accumulators.

17. A register array according to claim 16 wherein:

said paired accumulators are disposed in sequential relationship.

18. A register array according to claim 17 wherein:

said respective parts comprise 16 bit sections, and said vector comprises a 32 bit section.

19. A register array according to claim 15 wherein:

said plurality of accumulators comprises eight 40 bit accumulators with respective 16 bit parts to cooperatively define said vector; and said multiplier unit comprises two 16 bit multipliers that cooperatively produce a full 32 bit result for loading into said vector.

20. A reduced instruction data arithmetic unit for use in a digital signal processor, said unit including:

a data computation module for calculating values from respective sets of data and including a multiplier unit; and a data transfer path for directing the output of said calculated values and comprising a plurality of bus-accessible data path registers including respective output product registers, and a register array including a plurality of accumulators, said accumulators including respective high and low parts, the parts of different registers cooperatively defining a vector, said multiplier unit disposed downstream of said plurality of accumulators to receive data loaded from said defined vector, and a memory connected to said plurality of accumulators to store data from and load data to said defined vector, whereby said vector is effective to perform said loading or storing operations in a single instruction cycle.

21. A unit according to claim 20 wherein:

said plurality of accumulators comprise respective pairs of accumulators.

22. A unit according to claim 21 wherein:

said respective pairs are disposed in sequential relationship.

23. A unit according to claim 22 wherein:

said respective high parts comprise 16 bit sections, and said vector comprises a 32 bit section.

24. A unit according to claim 20 wherein:

said plurality of accumulators comprise eight 40 bit accumulators with respective 16 bit high parts to cooperatively define said vector; and said multiplier unit comprises two 16 bit multipliers that cooperatively produce a full 32 bit result.

* * * * *